INVENTOR.
D. E. BERGER

May 15, 1962 D. E. BERGER 3,034,307
CONTROL OF MULTI-UNIT FRACTIONATION SYSTEMS
Filed Aug. 27, 1958 5 Sheets-Sheet 5

INVENTOR.
D.E. BERGER
BY Hudson & Young
ATTORNEYS

United States Patent Office 3,034,307
Patented May 15, 1962

3,034,307
CONTROL OF MULTI-UNIT FRACTIONATION SYSTEMS
Donald E. Berger, Bartlesville, Okla., assignor to Phillips Petroleum Company, a corporation of Delaware
Filed Aug. 27, 1958, Ser. No. 757,562
13 Claims. (Cl. 62—37)

This invention relates to control systems for the separation of fluid streams by fractionation. In another aspect, this invention relates to a method for controlling multi-unit fractionation systems. In another aspect, this invention relates to a method of fractionating fluid mixtures in a multi-unit fractionation system.

In petroleum operations, it is often desirable to recover intermediately boiling constituents from a fluid mixture. Usually, a plurality of fractionation columns are required in order to effect a high degree of separation. One particular example of a process is the separation and recovery of ethylene in high purity from a stream containing methane and also containing ethane, propylene and other hydrocarbons having boiling points above ethylene. This separation can be advantageously accomplished by initially making a "rough" separation in a first column and a "clean-up" separation in a second column to obtain the desired product in high purity. Thus, the first or "rough cut" fractionation column is operated to separate a substantial proportion of the methane and light gases overhead, leaving the major proportion of the ethylene and heavier hydrocarbons as kettle product. The control of the first column is exercised in a manner to retain some of the methane in the kettle product because substantially complete separation of the methane overhead would also result in substantial loss of ethylene overhead. Separation of the methane from the ethylene in the kettle product is accomplished in a second or "clean-up" fractionation column following separation of the ethylene from ethane, propylene and heavier hydrocarbons in intervening columns. Basically, the first and the second columns perform the same fractionation duty or make the same split since methane and lighter gases are separated overhead from ethylene in the kettle product and a small amount of ethylene is lost overhead from each column.

In a fractionation process of this type where two or more columns perform similar fractionation, the maximum recovery of the desired product is achieved at one condition of load sharing between the columns performing the same fractionation duty because of the difference in the physical parameters in the separate columns. Thus, differences in column diameter, number of equilibrium steps in each column, and composition and feed rates to each column result in differing degrees of separation so that the loss of the desired product in the off-gas from each column is different. The most economical operation of the separation process results by balancing the operating level of each column performing the same fractionation duty to obtain the minimum loss of desired product.

An object of this invention is to provide an improved method for the separation of multi-component mixtures.

Another object of this invention is to provide a control system for optimizing the recovery of a desired product from a multi-component mixture containing the same in a multi-unit fractionation system.

Another object of this invention is to provide a control system for minimizing the loss of desired product in a multi-unit fractionation system.

Another object of this invention is to provide a control system for balancing the operating levels of a plurality of columns making similar separations in a multi-unit fractionation system.

Other aspects, objects and advantages of the invention are apparent from the consideration of the accompanying disclosure, drawings and the appended claims.

The present invention provides a control system and method of control, including a method of separating multi-component mixtures, for separations of the type where at least two fractionation columns perform similar fractionations to optimize the load sharing between said columns performing similar fractionations to thereby obtain maximum recovery of the desired product by minimizing the loss of desired product from said columns performing similar fractionations.

A process variable of all fractionating columns performing similar fractionations before the last such column is periodically changed to produce a new level of operation and a signal proportional to the predicted value of the total loss of desired product from all fractionating columns performing similar fractionations based on the new level of operation is compared in an optimizing means with a signal proportional to the actual value of the total loss of desired product from all fractionating columns performing similar fractionations after stabilization of the system while holding the purity of desired product substantially constant to obtain a difference signal which is the basis for making a further change in said process variable. The control system of this invention can be employed to optimize the sharing of the fractionation load between any number of columns which perform substantially the same fractionation duty. Also, fractionating columns performing different separations can be employed between fractionation columns performing similar fractionation controlled according to this invention. The loss of desired product can be measured in any product stream obtained from the fractionating columns controlled, such as the kettle product stream, the overhead product stream, or a side draw product stream.

Further features of the invention will become apparent from the following detailed description taken in conjunction with the accompanying drawings, in which.

Figure 4:
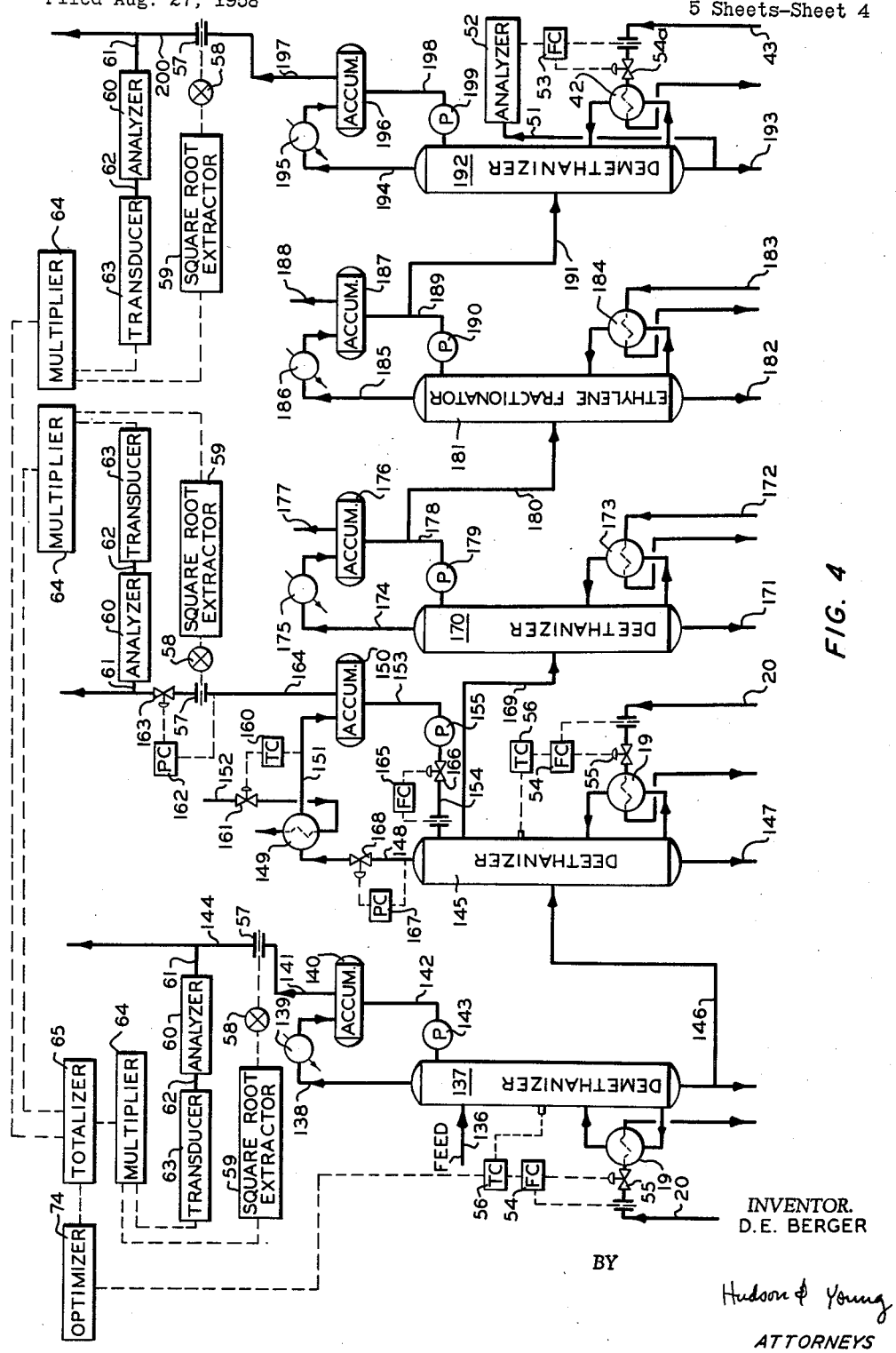
Figure 5:
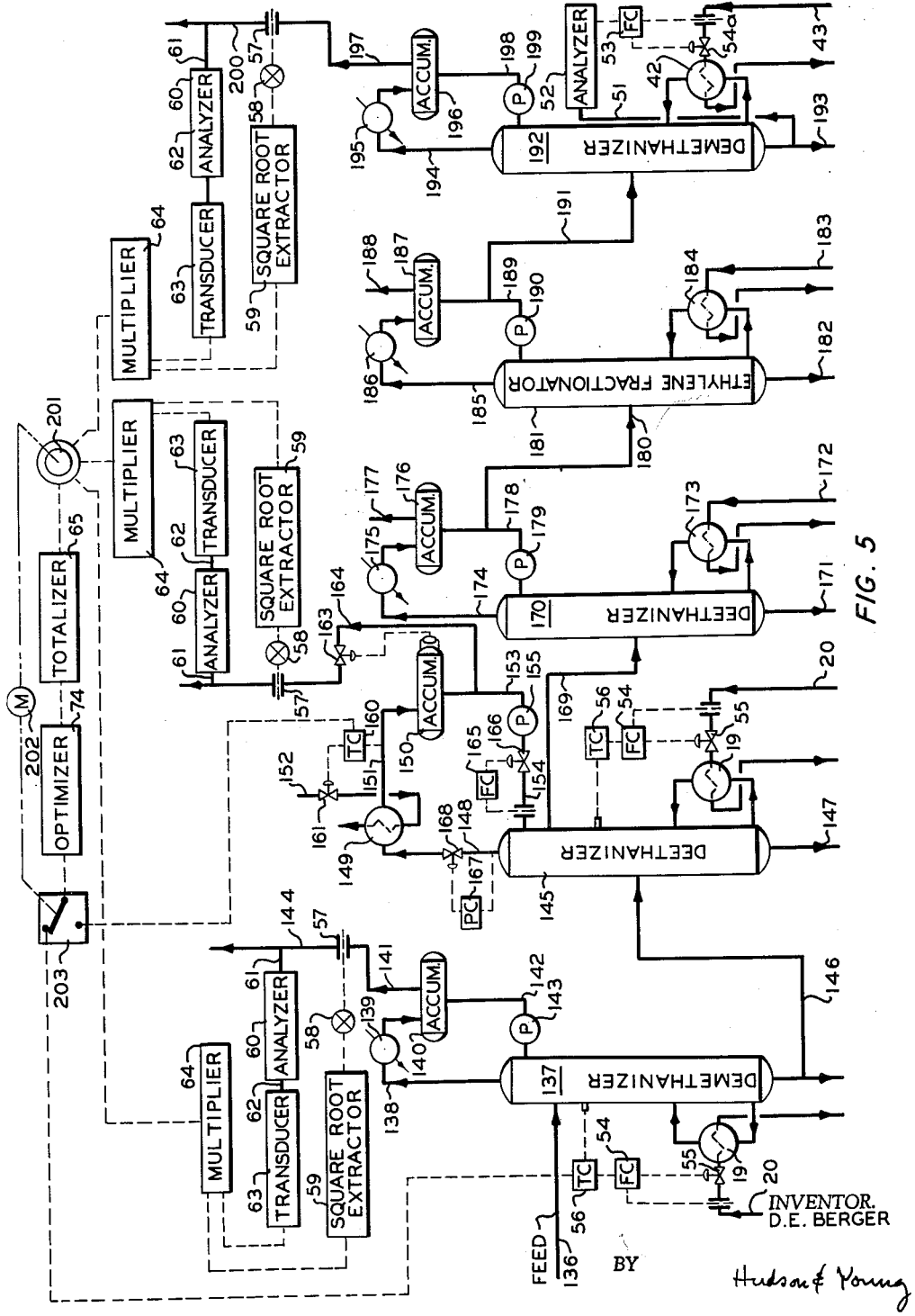

FIGURE 4 is a flow diagram of a fractionation process incorporating the control system of this invention wherein the loss from three fractionating columns performing similar fractionation is simultaneously totalized to determine the total loss of desired product; and FIGURE 5 is a flow diagram of a fractionation process incorporating the control system of this invention wherein the loss from a single fractionating column performing similar fractionation is alternatively totalized with the loss from two other fractionating columns performing similar fractionation to determine the total loss of desired product.

Figure 1:
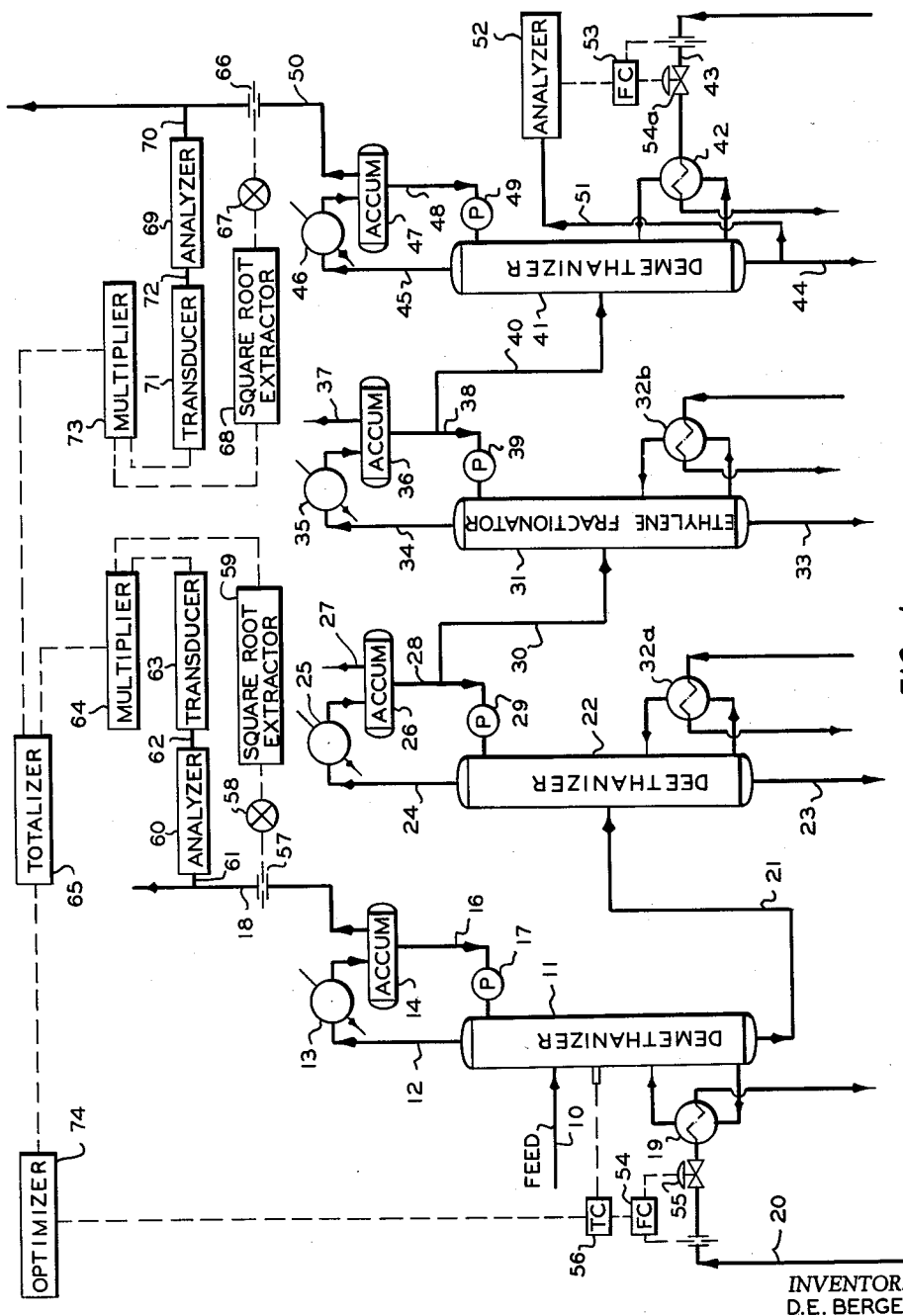
FIGURE 1 is a flow diagram of a fractionation process incorporating the control system of this invention wherein two columns perform similar fractionation and pneumatic computing means are primarily used to determine the loss of desired product in overhead product streams.

Referring to FIGURE 1, a feed stream to be separated containing ethylene as the desired product is introduced through conduit 10 into fractionating column 11 which acts as a demethanizer. Column 11 is operated to split the feed stream into overhead vapor containing the larger proportion of the hydrogen, methane and other light gases with small amounts of ethylene and ethane and a bottoms fraction containing the larger proportion of the ethylene, ethane, propylene, propane and heavier hydrocarbons, including a small amount of methane and other light gases. The overhead vapor is removed from column 11 through conduit 12 which communicates with condenser 13 and accumulator 14 which is operated to condense a portion of the methane and substantially all the ethylene in the overhead vapor. A portion of the condensed overhead vapor, comprising primarily methane with a minor proportion of ethylene, is circulated from accumulator 14 through conduit 16 by pump 17 into the upper part of column 11 as reflux. The remaining portion of the overhead vapor is withdrawn from accumulator 14 through conduit 18. The ethylene contained in this latter stream is lost from the process. Column 11 is provided with a reboiler 19 through which a heating medium is circulated by means of conduit 20. The bottoms fraction, containing ethylene, ethane, propylene and heavier hydrocarbons and a minor amount of methane is withdrawn from the bottom of column 11 as kettle product through conduit 21 and introduced into column 22 which is operated as a deethanizer.

Column 22 is operated to split the bottoms fraction from column 11 into overhead vapor containing primarily ethylene and ethane with a minor proportion of methane and other hydrocarbons and a bottoms fraction containing most of the propylene, propane and heavier hydrocarbons. The bottoms fraction is withdrawn from column 22 through conduit 23. The overhead vapor is withdrawn from the top of column 22 through conduit 24 which communicates with condenser 25 and accumulator 26. The noncondensible gases are withdrawn from accumulator 26 through conduit 27 periodically and the condensed overhead product is withdrawn through conduit 28. A portion of the condensed overhead vapor is recycled by pump 29 to the top of column 22 as reflux and the remaining portion introduced through conduit 30 into fractionating column 31 which is operated as an ethylene fractionator. Reboiler 32a is provided for heating the lower portion of column 22.

Column 31 is operated to split the overhead product from column 22 into overhead vapor rich in ethylene but containing a smaller proportion of methane and a bottoms fraction rich in ethane. Reboiler 32b provides for heating the lower section of column 31. The bottoms fraction is withdrawn from column 31 through conduit 33 as kettle product. The overhead vapor is withdrawn through conduit 34 which communicates with condenser 35 and accumulator 36. Noncondensible gases are removed from accumulator 36 through conduit 37. Condensed overhead is withdrawn from accumulator 36 through conduit 38 and a portion recycled to column 31 as reflux by means of pump 39. The remaining portion of condensed overhead is introduced through conduit 40 into fractionation column 41 which is operated as a demethanizer.

Column 41 is operated to make the same split or separation made in column 11; i.e., an overhead fraction comprising essentially methane with a minor amount of ethylene and a bottoms fraction comprising essentially ethylene are formed. Column 41 is heated by reboiler 42 with the flow of the heat exchange medium through conduit 43 in communication with reboiler 42. The bottoms fraction, which is the ethylene product of the process, is removed from column 41 as kettle product through conduit 44. The overhead vapor is removed from the top of column 41 through conduit 45 in communication with condenser 46 and accumulator 47. The condensed overhead product is withdrawn from accumulator 47 through conduit 48 and recycled to column 41 by pump 49 as reflux. The non-condensed overhead vapor is withdrawn from accumulator 47 through conduit 50. The ethylene in the stream withdrawn through conduit 50 is lost from the process.

The purity of the ethylene product withdrawn from column 41 through conduit 44 is controlled by the regulation of the amount of heat introduced into the bottom of column 41 by means of reboiler 42. The sample is withdrawn from conduit 44 through conduit 51 which communicates with analyzer 52 adapted to provide a signal which is representative of the concentration of methane in the ethylene product stream. Preferably, analyzer 52 is an infrared analyzer such as disclosed in U.S. Patent 2,579,825 for example; however, in some applications, this analyzer can advantageously be a differential refractometer, such as disclosed in U.S. Patent 2,724,304 for example. The output signal of analyzer 52 is applied to flow rate controller 53 to manipulate the set point thereof. Flow rate controller 53 adjusts the setting of valve 54a in conduit 43 to thereby regulate the flow of heat exchange medium through conduit 43 to reboiler 42. Flow rate controller 53 can be any conventional commercially available flow rate controller such as for example, the Model 58 instrument of the Foxboro Company, Foxboro, Massachusetts. In this manner, an increase in methane concentration in the ethylene product stream above the concentration corresponding to the flow of heat exchange medium through reboiler 42 as determined by the set point of flow rate controller 53 is detected by analyzer 52 which moves the set point of flow rate controller 53 to supply more heat exchange medium to reboiler 42 to raise the temperature in the lower region of column 41 and effect increased vaporization of methane.

The operation of column 11 is effected by control of the heat supplied by means of reboiler 19. Thus, flow rate controller 54 provides a signal which is representative of the rate of flow of heat exchange medium to reboiler 19 and adjusts the setting of valve 55 in conduit 20. Temperature controller 56 provides a signal which is representative of temperature within column 11 and manipulates the set point of flow rate controller 54a to maintain constant temperature within column 11 at the measuring point. Flow rate controller 54a and temperature controller 56 can be any conventional commercially available instrument such as the Model 58 instrument of the Foxboro Company. The set point of temperature controller 56 is manipulated by other control instruments which operate in a manner to be described hereinafter.

The ethylene lost in the overhead product stream from column 11 withdrawn through conduit 18 is determined from measurements of the rate of flow of the overhead product stream and the concentration of ethylene in that stream. A pressure differential developed across orifice 57 located in conduit 18 is transmitted by differential pressure transmitter 58, such as a Foxboro d/p cell, to square root extractor 59 which can be any commercially available instrument which provides a signal that is linear and directly proportional to rate of flow, such as, for example a Minneapolis-Honeywell Sorteburg force bridge as described in U.S. Patent 2,643,055. Analyzer 60, which preferably is an infrared analyzer as described in U.S. Patent 2,579,825, in communication with conduit 18 through conduit 61, provides a signal representative of concentration of ethylene in the overhead product stream withdrawn through conduit 18. This signal is transmitted electrically through conduit 62 to transducer 63 which provides a pneumatic output signal proportional to the concentration of ethylene. Transducer 63 can be any commercially available instrument which will transpose an electrical input signal into a pneumatic output signal, for example, a Brown Electronik Air-O-Line controller as described in Brown Instrument catalog 1531 or a Swartwout Power Relay as described in Bulletin A-710 of the Swartwout Company of Cleveland, Ohio.

The linear signal from square root extractor 59 proportional to rate of flow and the linear signal from transducer 63 proportional to ethylene concentration are supplied to analog multiplier 64 which produces a pneumatic output signal proportional to the product of the rate of flow times ethylene concentration. Analog multiplier 64 can be any conventional computing device which multiplies input signals to produce an output signal which is a product of the input signals. The output signal from analog multiplier 64 is supplied to totalizer 65 to be added with a signal obtained from column 41 in a manner described hereinafter.

The ethylene lost in the overhead product stream withdrawn from column 41 through conduit 50 is determined in the same manner as the ethylene lost in the overhead product stream from column 11. Thus, a linear pneumatic signal proportional to rate of flow of overhead product withdrawn through conduit 50 is obtained from square root extractor 68, orifice 66 located in conduit 50, and differential pressure transmitter 67. Also, a linear pneumatic signal proportional to ethylene concentration is obtained from analyzer 69 in communication with conduit 50 through conduit 70 and transducer 71 in communication with analyzer 69 through conduit 72. The output signals from square root extractor 68 and transducer 71 are supplied to analog multiplier 73 which produces a pneumatic output signal proportional to the product of rate of flow times ethylene concentration. This signal is a measure of the loss of ethylene from column 41. The output signal from analog multiplier 73 is supplied to totalizer 65 to obtain an additive signal that is proportional to the total loss of ethylene from columns 11 and 41. Totalizer 65 can be any conventional commercial instrument, such as, for example, a Foxboro model 56–1 computing relay as described in Foxboro bulletin TI–37–A–57a.

The additive signal from totalizer 65 is supplied to optimizer 74 which can be any conventional commercially available instrument which produces a signal output corresponding to the difference between the predicted value of a controlled variable in a system and the actual value at which the system stabilizes after a change in the controlled variable, such as, for example, the Quarie optimal controller manufactured by Quarie Controllers, Sharon, Massachusetts. Optimizer 74 produces a signal which is supplied to temperature controller 56 to manipulate the set point of temperature controller 56 which then manipulates the set point of the flow rate controller 54 connected in cascade therewith. Thus, the output signal from optimizer 74 adjusts valve 55 in conduit 20 and thereby regulates the amount of heat supplied to the lower portion of column 11.

In operation, optimizer 74, which is a zero slope controller, predicts the total loss of ethylene from columns 11 and 41 in the overhead products as the result of a change in the amount of heat supplied to column 11. The difference between this predicted value of ethylene loss and the actual value of ethylene loss from both columns 11 and 41 after the system has stabilized to the new operating level is determined by optimizer 74 which produces a signal supplied to controller 56 to either increase, decrease or keep the rate of heat input into column 11 the same. The sequence of changing the rate of heat input, predicted the new value of total ethylene loss and determining the actual total ethylene loss after the system has stabilized to the new rate of heat input continues until the predicted and actual values are the same and the system is at the proper control slope. In effect, optimizer 74 regulates the operating level of column 11, and thus the division of the fractionating loads between columns 11 and 41 which are each making the same separation, to produce that sharing of fractionating loads between these two columns which results in minimum total loss of ethylene and optimum operation of the process.

Figure 2:
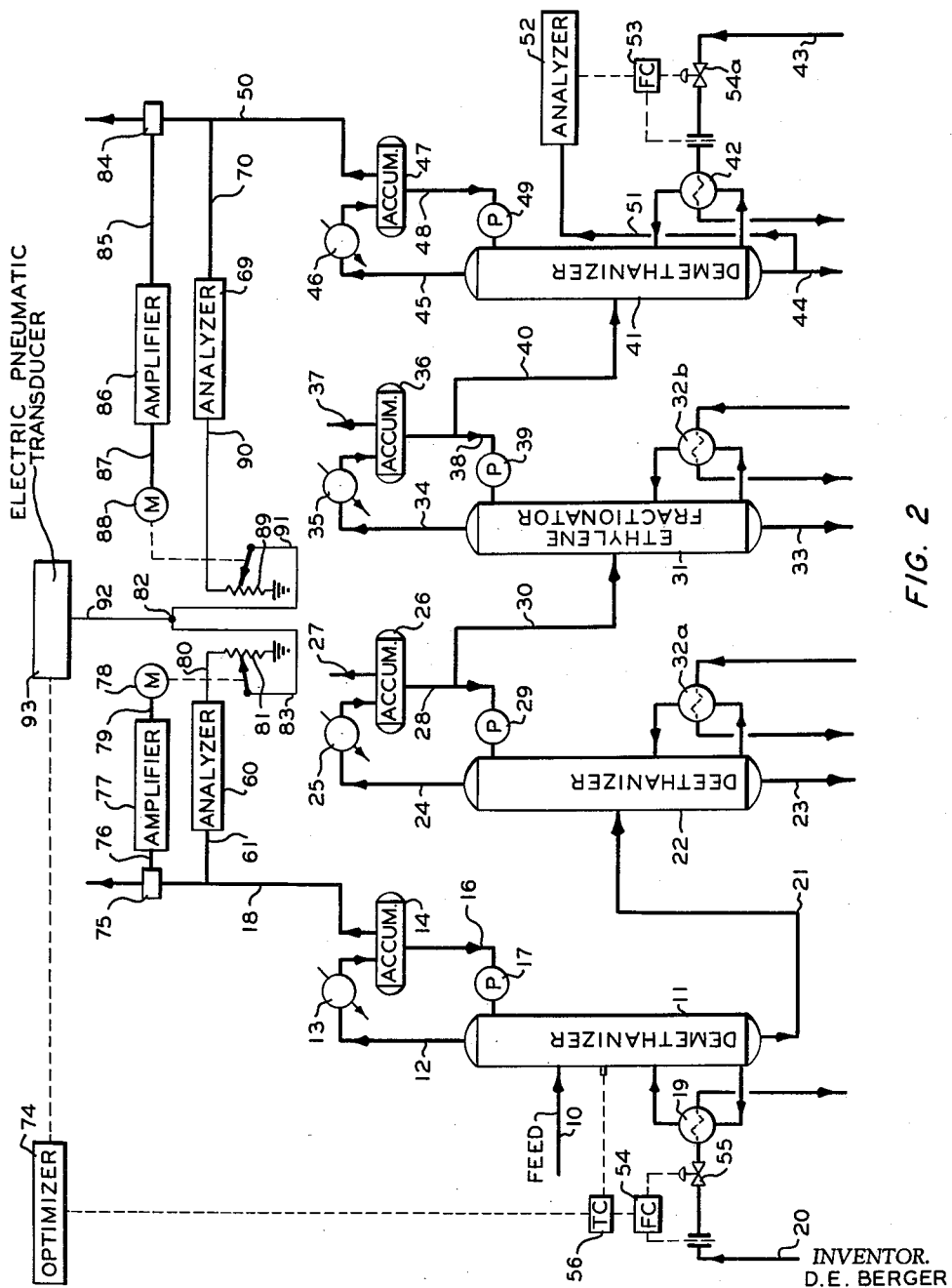
FIGURE 2 is a flow diagram of the fractionation process incorporating the control system of this invention wherein two columns perform similar fractionation and electrical computing means are primarily used to determine the loss of desired product in overhead product streams.

Referring to FIGURE 2, wherein an electrical control system is used in a separation process which is the same as the process shown in FIGURE 1, the same reference characters used in FIGURE 1 represent these same elements in FIGURE 2. Demethanizing columns 11 and 41 perform similar fractionations producing overhead product streams containing a large proportion of methane and lighter gases with a minor amount of ethylene which is the desired product of the separation. Analyzer 60, in communication with conduit 18 through conduit 61, produces an electrical signal which is representative of the concentration of ethylene in the overhead product stream from column 11. The rate of flow of overhead product stream through conduit 18 is determined by electrical flowmeter 75 which may be any electrical type flowmeter producing a linear signal proportional to rate of flow, such as, for example, the Potter flowmeter manufactured by the Potter Aeronautical Corporation. The output signal from electrical flowmeter 75 is applied by line 76 to amplifier 77 which is connected to reversible servomotor 78 by line 79. The output voltage proportional to concentration from amplifier 60 is applied by line 80 to one terminal of potentiometer 81 which is grounded at the other terminal. The drive shaft for servomotor 78 is mechanically connected to the contactor of potentiometer 81 which is connected to a junction point 82 by line 83. Amplifier 77, servomotor 78 and potentiometer 81 together form a servomultiplier which produces an electrical signal which is proportional to the concentration of ethylene in the overhead product stream times the rate of flow of the overhead product stream. An electrical signal proportional to the product of ethylene concentration and rate of flow of the overhead product stream withdrawn from column 41 through conduit 50 is obtained in a similar manner as just described. Thus, electrical flowmeter 84 in conduit 50 is connected by means of line 85 to amplifier 86 which supplies an electrical output signal by means of line 87 to reversible servomotor 88. Further, analyzer 69, which is in communication with conduit 50 through conduit 70, produces an electrical signal which is proportional to concentration and is applied to one terminal of potentiometer 89 by means of line 90 with the contactor of potentiometer 89 connected to junction point 82 by means of line 91.

At junction point 82 linear electrical signals proportional to the quantity of ethylene lost in the overhead product streams from column 11 and column 41 are added to produce a single electrical signal which is proportional to the total loss of ethylene from the system. This signal proportional to the total loss of ethylene is applied by means of line 92 to electric-pneumatic transducer 93 which produces a pneumatic output signal proportional to the total loss of ethylene. Transducer 93 may be any commercially available electric-pneumatic transducer such as, for example, the Brown Electronik Air-O-Line controller, manufactured by the Brown Instrument Company.

The pneumatic output signal from transducer 93 is supplied to optimal controller 74 where it is compared to a signal proportional to the predicted value of the total loss of ethylene from the system based upon the rate of flow of heat into column 11 as determined by the set point on temperature controller 56 cascaded to flow rate controller 54. As described with respect to the control system of FIGURE 1, optimal controller 74 produces a difference signal which manipulates the set point of temperature controller 56 which manipulates the set point of flow rate controller 54 to either increase, decrease or keep the rate of heat input to column 11 the same in order to produce that sharing of fractionating loads between columns 11 and 41 which results in a minimum total loss of ethylene from the process.

Figure 3:
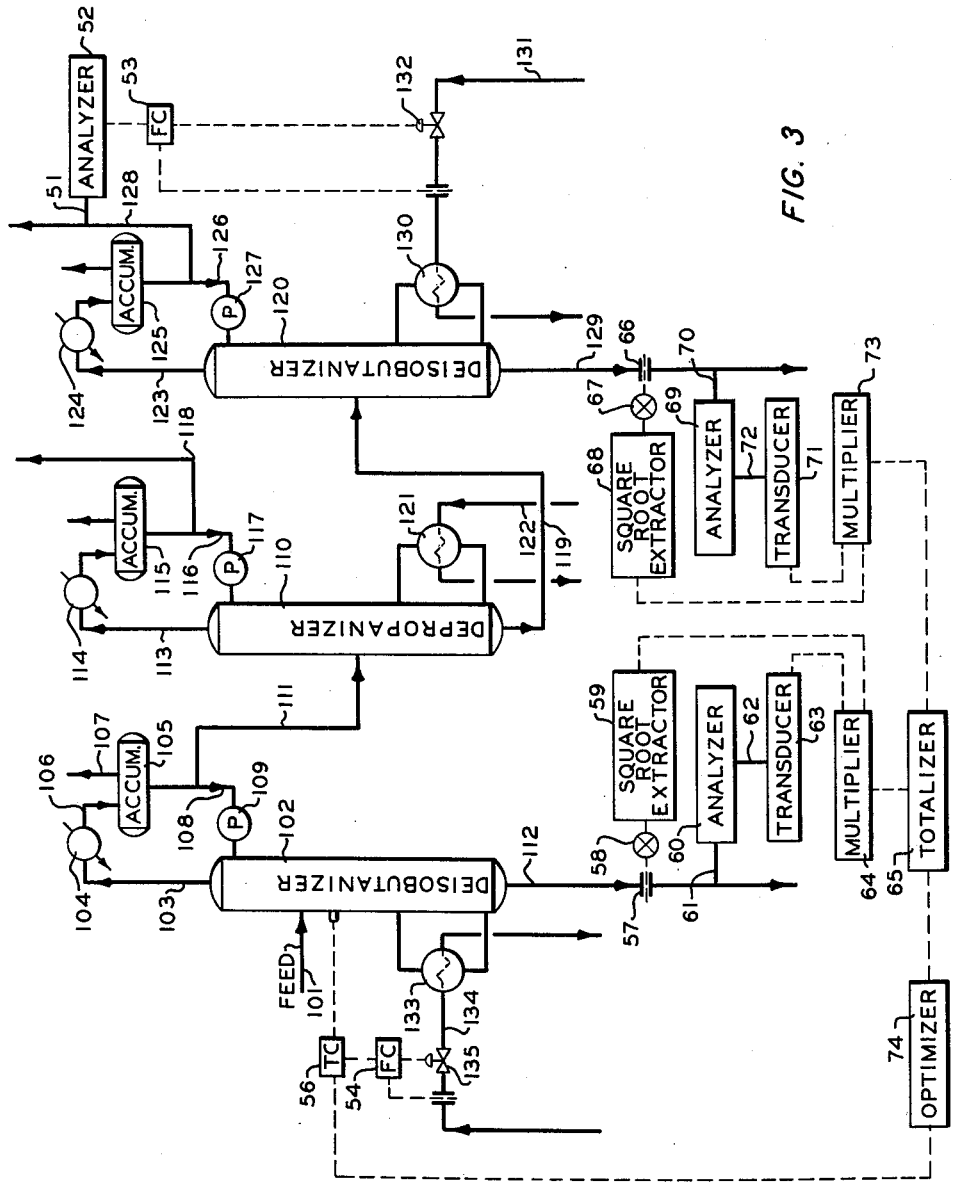
FIGURE 3 is a flow diagram of a fractionation process incorporating the control system of this invention wherein two columns perform similar fractionation and pneumatic computing means are used to determine the loss of desired product in kettle product streams.

Referring to FIGURE 3 of the drawings, the pneumatic control system described in FIGURE 1 is applied to the kettle product streams produced in two deisobutanizer columns to obtain isobutane as the desired product in an overhead product stream with a minimum loss of isobutane in the kettle product streams. The same reference characters used for the elements of the control system in FIGURE 1 are used for similar elements in FIGURE 3. The feed stream to be separated is supplied through conduit 101 into fractionating column 102 which acts as a deisobutanizer to split the feed stream into overhead vapor containing most of the isobutane and propane with a minor amount of normal butane and a bottoms fraction containing most of the normal butane with a minor amount of isobutane which is lost from the process. The overhead vapor removed from the top of column 102 through conduit 103 is condensed in condenser 104 which communicates with accumulator 105 through conduit 106. Accumulator 105 is operated to condense the normal butane, isobutane and propane present in the overhead vapor with any noncondensible gases being withdrawn through conduit 107. The condensed overhead fraction is withdrawn from accumulator 105 through conduit 108 and a portion recycled by means of pump 109 into the top of column 102 as reflux. The remaining portion of condensed overhead fraction is withdrawn from accumulator 105 and supplied to depropanizer column 110 through conduit means 111. The bottoms fraction is withdrawn from column 102 through conduit 112 and the small amount of isobutane in this stream is determined by differential pressure means 57, differential pressure transmitter 58, square root extractor 59, analyzer 60, transducer 63, and analog multiplier 64 in the manner as described with respect to FIGURE 1.

Depropanizer column 110 produces an overhead fraction of propane and a bottoms fraction of isobutane containing a minor amount of normal butane. The propane is removed from column 110 through conduit means 113 and condensed in condenser 114 connected to accumulator 115. A portion of the condensed overhead vapor is recycled through conduit means 116 and pump 117 into the top of column 110 as reflux. The remaining portion of the condensed overhead vapor is withdrawn from the process through conduit means 118. The bottoms fraction is withdrawn through conduit means 119 and supplied to deisobutanizer column 120. Reboiler means 121 provides for the required amount of heat in column 110 by the circulation of a heat exchange medium through conduit means 122.

In column 120 an overhead fraction consisting essentially of isobutane with a very minor amount of normal butane as an impurity and a bottoms fraction comprising normal butane containing a minor amount of isobutane is formed. The overhead vapor is removed from column 120 through conduit means 123 and condensed in condenser 124 which is connected to accumulator 125. The condensed overhead vapor is withdrawn from accumulator 125 through conduit means 126 and a portion thereof recycled to the top of column 120 by means of pump 127 as reflux. The remaining portion of condensed reflux is withdrawn from the process through conduit means 128 as the desired product of the separation process. The bottoms fraction is removed from column 120 through conduit means 129 and the small amount of isobutane lost from the process determined in the manner as described with respect to FIGURE 1. Thus, a linear pneumatic signal proportional to rate of flow is produced by differential flow means 66, differential pressure transmitting means 67, and square root extractor 68. The concentration of normal butane in the kettle product stream is determined by analyzer 69 connected to conduit means 129 by means of conduit 70 with the electrical output signal from analyzer 69 being supplied to transducer 71 by means of line 72 to produce a pneumatic signal proportional to concentration. The signal proportional to rate of flow is multiplied with the signal proportional to concentration in analog multiplier 73.

The purity of the isobutane product withdrawn through conduit means 128 from column 120 is maintained substantially constant by controlling the rate of heat input into reboiler 130 through conduit means 131. Analyzer means 52 in communication with conduit means 128 through conduit means 51 determines the concentration of normal butane in the isobutane product stream and produces an output signal which resets flow rate controller 53 controlling the rate of flow of heat input into reboiler 130 by adjusting valve 132 in conduit means 131 in response to the rate of flow in conduit means 131.

The pneumatic signals proportional to the loss of isobutane in columns 102 and 120 are supplied by analog multipliers 64 and 73, respectively, to analog totalizer 65 which produces an output signal proportional to the total loss of isobutane from the system. The output signal from totalizer 65 is supplied to optimizer 74 which adjusts the set point on temperature controllers 56 which adjusts the set point of flow rate controller 54 to control the rate of heat input, and thus the level of operation, in column 102. Heat is supplied to column 102 by means of reboiler 133 through which is circulated a heat exchange medium through conduit 134. Valve 135 in conduit 134 is adjusted by flow rate controller 54 to control the rate of flow of heat exchange medium into reboiler 133.

The operation of the control system of FIGURE 3 is similar to the operation described with respect to FIGURE 1. That is, optimizer 74 predicts the total loss of isobutane from columns 102 and 120 in the kettle product streams as a result of the change in the amount of heat supplied to column 102. The difference between this predicted value of isobutane loss and the actual value after the system has stabilized to the new operating level is then determined by optimizer 74 which produces a signal supplied to temperature controller 56 in cascade with flow rate controller 54 to either increase, decrease or keep the rate of heat input into column 11 the same in order to produce that sharing of the fractionating loads between columns 102 and 120 which results in the minimum total loss of isobutane from the system.

In FIGURE 4, the pneumatic control system of FIGURE 1 is applied to overhead product streams from three separate columns performing similar fractionations to produce a signal proportional to the loss of ethylene from each such column. The feed stream to be separated is supplied through conduit means 136 to demethanizer column 137 to produce an overhead fraction containing a large proportion of methane with a minor amount of ethylene and a bottoms fraction containing ethylene and heavier hydrocarbons with a minor amount of methane. The overhead vapor is withdrawn from column 137 through conduit means 138 and condensed in condenser 139 which is connected to accumulator 140. Condenser 139 is operated to condense substantially all the ethylene and a portion of the methane with the noncondensed methane and ethylene being removed from accumulator 140 through conduit means 141. The condensed overhead vapor is withdrawn from accumulator 140 through conduit means 142 and recycled by means of pump 143 into the top of column 137 as reflux. The remaining overhead vapor is withdrawn through conduit means 144. The bottoms fraction from column 137 is supplied to deethanizer 145 through conduit means 146.

Deethanizer 145 is operated to produce an overhead fraction containing primarily methane with a minor amount of ethylene, an intermediate fraction containing primarily ethylene and ethane with a minor amount of methane, propylene, and heavier hydrocarbons and a bottoms fraction containing propylene and heavier hydrocarbons substantially free of ethylene. The bottoms fraction is removed from column 145 through conduit means 147. The overhead vapor is removed from the top of column 145 through conduit means 148 to condenser 149 which is in open communication with accumulator 150 through conduit means 151. The overhead vapor is cooled by the circulation of a coolant through conduit means 152 connected to condenser 149. The condensed overhead vapor is withdrawn from accumulator 150 by means of conduit 153 and recycled through conduit means 154 by means of pump 155 into the top of deethanizer 145 as reflux. The operation of condenser 149 is controlled by temperature controller 160 which has a temperature element in conduit means 151 and which adjusts valve 161 in conduit means 152 through which coolant is supplied to condenser 149. Pressure controller 162 adjusts valve 163 in conduit 164 through which noncondensible gases are withdrawn from accumulator 150 to maintain steady pressure within accumulator 150. Flow rate controller 165 adjusts the opening of valve 166 in conduit means 154 to maintain the rate of recycle of reflux to the top of column 145 substantially constant. Pressure controller 167 adjusts valve 168 in conduit 148 to hold the pressure in column 145 substantially constant. Pressure controllers 162 and 167, together with flow rate controller 165 and temperature controller 160, operate to maintain the composition of the ethylene-ethane stream withdrawn through conduit means 169 substantially constant. One end of conduit means 169 is disposed in the upper region of column 145 below the point where conduit 154 enters the column and removes ethylene and ethane as a side draw product which is supplied to deethanizer column 170.

The level of operation of columns 137 and 145 is established at a particular degree of separation by controlling the rate of heat input into the respective columns. Thus, as was employed in the separation process of FIGURE 1, a heat exchange medium is circulated through conduit means 20 into a reboiler 19 which is connected to the lower portion of each column. The rate of flow of heat exchange medium is controlled by flow rate controller 54 associated with each column which adjusts separate valves 55 in conduit means 20. Separate temperature controllers 56 manipulate the control point of flow rate controllers 54 in accordance with the temperature within the separate columns 137 and 145. In FIGURE 4, the same reference characters are used for each of these elements as is given in FIGURE 1.

In deethanizer column 170 is formed an overhead vapor comprising ethane and ethylene with a minor amount of methane and a bottoms fraction comprising propylene and heavier hydrocarbons. The bottoms fraction is withdrawn from column 170 through conduit means 171. Heat is supplied to column 170 by the circulation of heat exchange medium through conduit 172 into reboiler 173 connected to the lower part of column 170. The overhead vapor is withdrawn from column 170 through conduit 174 and condenser 175 which is connected to accumulator 176. Condenser 175 is operated so that substantially all the overhead vapor is condensed and noncondensible gases are withdrawn from accumulator 176 through conduit 177. The condensed overhead vapor is withdrawn from accumulator 176 through conduit 178 and a portion thereof recycled by means of pump 179 to the top of column 170 as reflux. The remaining portion of condensed overhead vapor is withdrawn through conduit 180 to ethylene fractionator 181.

In ethylene fractionator 181 is formed an overhead fraction comprising essentially ethylene with a minor amount of methane and a bottoms fraction comprising essentially all ethane. The bottoms fraction is withdrawn through conduit 182. Heat is supplied to column 181 through conduit 183 by means of the circulation of a heat exchange medium through reboiler 184 which is connected to the lower part of column 181. The overhead vapor is withdrawn from the top of column 181 through conduit 185 and condensed in condenser 186 which is connected to accumulator 187 operated so that substantially all the overhead fraction is condensed. Noncondensible gases are withdrawn from accumulator 187 through conduit 188. Condensed overhead vapor is withdrawn from accumulator 187 through conduit 189 and a portion thereof recycled by means of pump 190 to the top of ethylene fractionator 181 as recycle. The remaining portion of condensed overhead vapor is withdrawn through conduit 191 to demethanizer column 192.

In demethanizer column 192 is formed an overhead fraction comprising essentially methane with a minor amount of ethylene which is lost from the process and a bottoms fraction comprising essentially all ethylene which is the product of the process. The bottoms fraction is withdrawn from column 192 through conduit 193. The purity of the ethylene product withdrawn through conduit 193 is maintained substantially constant in the same manner as was employed in the process of FIGURE 1 by controlling the rate of heat input into column 192 in accordance with the concentration of methane in the bottoms fraction. Thus, analyzer 52 in open communication by means of conduit 51 with conduit 193 produces a signal which represents the concentration of methane in the ethylene product stream and manipulates the control point on flow rate controller 53 which adjusts the position of valve 54a in conduit 43 to thereby control the rate of introduction of heat exchange medium into reboiler 42 connected to the lower section of column 192. The overhead vapor is withdrawn from column 192 through conduit 194 and condensed in condenser 195 which is connected to accumulator 196. Conduit 197, in communication with conduit 200, provides an outlet for noncondensed methane and ethylene from accumulator 196. The overhead vapor condensed in accumulator 196 is withdrawn through conduit 198 and recycled by means of pump 199 into the top of column 192 as reflux.

Columns 137, 145 and 192 perform similar separations in that bottom and side draw fractions containing ethylene with a minor amount of methane and overhead fractions containing methane with a minor amount of ethylene are formed. The ethylene in these fractions as removed through conduits 144, 164, and 200 is lost from the process. The quantity of ethylene lost from each of these columns is determined in the same manner as described in FIGURE 1. Thus, using the same reference characters in FIGURE 4 for each of the elements of FIGURE 1, a pneumatic signal proportional to rate of flow is produced by differential pressure means 57, differential pressure transmitting means 58, and square root extractor 59 to be multiplied in multiplier 64 with a pneumatic signal proportional to concentration produced by analyzer 60 and transducer 63 in combination with conduits 61 and 62.

The pneumatic signals from each multiplier 64 proportional to the quantity of ethylene lost from each column 137, 145 and 192 are supplied to totalizer 65 which produces an output signal proportional to the total loss of ethylene from the system. As was described with respect to FIGURE 1, the output of totalizer 65 is supplied to optimizer 74 which predicts the total loss of ethylene from columns 137, 145 and 192 in the overhead product streams as a result of a change in the level of operation of columns 137 and 145. The difference signal between this predicted value of ethylene loss and the actual value of ethylene loss is supplied to temperature controller 56 in cascade with flow rate controller 54 to either increase, decrease or keep the amount of heat input into column 137 the same.

In the control system shown in FIGURE 5, is shown another method for minimizing the loss of ethylene from the separation process shown in FIGURE 4 where three columns perform similar fractionation. The fractionation process and the control systems for obtaining signals proportional to the quantity of ethylene lost from each column performing similar fractionation is the same as in FIGURE 4 and, therefore, is not again described. The same reference characters are used in FIGURE 5 for similar elements in FIGURE 4. With reference to FIGURE 5, the pneumatic signals obtained from each multiplier 64 associated with columns 137, 145, and 192 are supplied to a rotary valve means 201 which is mechanically linked by motor 202 to two-position switch 203. Rotary valve means 201 operates in an alternative manner to first supply signals from multiplier 64 associated with column 192 and multiplier 64 associated with column 137 and then to supply signals from multiplier 64 associated with column 192 and multiplier 64 associated with column 145 to totalizer 65 which produces an output signal which is first proportional to the loss of ethylene from columns 192 and 137 and then from columns 192 and 145. The output from totalizer 65 is supplied to optimizer 74 which alternatively predicts the loss of ethylene from first columns 192 and 137 and then from columns 192 and 145 as determined by the position of switch 203. Motor 202 provides for a synchronous operation between rotary valve means 201 and switch 203 so as to maintain separate control of columns 137 and 145. The difference signal produced by optimizer 74 when the loss of ethylene from column 137 is totalized with the loss from column 192 is supplied to temperature controller 56 associated with column 137 to manipulate the control point on flow rate controller 54 which adjusts the position of valve 55 to control the amount of heat supplied to column 137. The output signal obtained from optimizer 74 when the loss of ethylene from columns 145 and 192 is totalized manipulates temperature controller 160 to control the amount of overhead vapor condensed in condenser 149 and thereby control the level of operation of column 145. In this manner, optimizer 74 alternatively controls columns 137 and 145 to obtain the minimum loss of ethylene from the system.

In a specific example employing the control system described in FIGURE 1 of the drawings, demethanizer column 11 was operated with a top temperature of −92° F. and a bottom temperature of 38° F. at a top pressure of 421 p.s.i.g. and a bottom pressure of 425 to separate methane from ethylene. The feed was introduced into demethanizer column 11 at a pressure of 423 p.s.i.g. and a temperature of −80° F. The kettle product withdrawn through conduit 21 and introduced into deethanizer column 22 at a pressure of 388.5 p.s.i.g. Deethanizer column 22 was operated with a top temperature of 14° F. and a bottom temperature of 160° F. while the top pressure was 387 p.s.i.g. and the bottom pressure was 391 p.s.i.g. The overhead product withdrawn through conduit 30 was introduced into ethylene fractionator 31 at a pressure of 275 p.s.i.g. Column 31 was operated with a top temperature of −20° F. and a bottom temperature of 19° F. while the pressure was 272 p.s.i.g. at the top and 277 p.s.i.g. at the bottom. The overhead product was withdrawn through conduit 40 and introduced into demethanizer column 41 which was operated at a top temperature of −19° F. and a bottom temperature of −17° F. with a top pressure of 287 p.s.i.g. and a bottom pressure of 290 p.s.i.g. The compositions and flow rates through the several conduits of the apparatus shown in FIGURE 1 are as follows:

cluding method of separation, to provide optimum sharing of the fractionation load between fractionating columns performing similar fractionations to minimize the loss of desired product from the process, said system comprising periodically changing a process variable of all fractionating columns performing similar fractionation before the last such column to produce a new level of operation, predicting the total loss of desired product lost from the process after stabilization of the operation, comparing the predicted and actual values of desired product lost to obtain a difference signal, and utilizing said difference signal as a basis for making further changes in said process variable.

I claim:

1. A method of separating a mixture in a multi-unit fractionation system to form a desired product comprising fractionating said mixture in a first fractionation step to make a first rough separation by forming at least a first product stream and a second product stream, said first product stream containing a major proportion of said desired product and said second product stream containing a minor proportion of said desired product, fractionating said first product stream in a second fractionation step to make a second rough separation by forming at least a third product stream and a fourth product stream, said third product stream containing a major proportion of said desired product and said fourth product stream containing a minor proportion of said desired product, fractionating said third product stream in a third fractionation step to make a fine separation by forming at least a fifth product stream and a sixth product stream, maintaining the concentration of desired product in said third and said fifth product streams substantially constant, measuring the total quantity of said desired product in said second, said fourth and said sixth product streams, periodically adjusting said first and said second fractionation steps in response to said measured total quantity of desired product to minimize the loss of said desired product in said second, said fourth and said sixth product streams, and recovering said fifth product stream at substantially constant concentration of desired product as product of the separation.

2. The method of separating a mixture in a multi-unit fractionation system to form a desired product comprising fractionating said mixture in a first fractionation step to form at least an overhead fraction containing a minor quantity of said desired product and a bottoms fraction containing a major proportion of said desired product, fractionating said bottoms fraction in a second fractionation step to form at least an overhead fraction containing a minor quantity of said desired product and a bottoms fraction containing a major proportion of said desired product, maintaining the concentration of said desired product in the last of said bottoms fractions substantially constant by regulating the degree of said sec-

|  | Conduit 10 | Conduit 18 | Conduit 21 | Conduit 30 | Conduit 23 | Conduit 40 | Conduit 33 | Conduit 50 | Conduit 44 |
|---|---|---|---|---|---|---|---|---|---|
| Hydrogen | 1,434 | 1,434 | | | | | | | |
| Methane | 25,918 | 25,898 | 20 | 20 | | 20 | | 18 | 2 |
| Acetylene | 378 | 30 | 348 | 348 | | 348 | | 3 | 345 |
| Ethylene | 39,174 | 2,324 | 36,850 | 36,850 | | 36,618 | 232 | 366 | 36,252 |
| Ethane | 11,058 | 546 | 10,512 | 10,500 | 12 | 156 | 10,344 | | 156 |
| Propylene | 11,564 | | 11,564 | 268 | 11,296 | | 268 | | |
| Propane | 6,760 | | 6,760 | 88 | 6,672 | | 88 | | |
| C₄⁺ | 2,518 | | 2,518 | | 2,518 | | | | |
| Total | 98,804 | 30,232 | 68,572 | 48,074 | 20,498 | 37,142 | 10,932 | 387 | 36,755 |

The above figures are in pounds per hour, based on condensed liquids.

Reasonable variation and modification are possible within the scope of the foregoing disclosure, drawings and the appended claims to the invention, the essence of which is that there have been provided an improved control system for multi-unit fractionation processes, inond fractionation, measuring the total quantity of said desired product in said overhead fractions, periodically adjusting said first fractionation step in response to said measured total quantity of desired product to minimize the amount of said desired product in each of said overhead fractions, and recovering said bottoms fraction from said second fractionation step as product of the process.

3. The method of separating a mixture in a multi-unit fractionation step to form a desired product comprising fractionating said mixture in a first fractionation step to form at least a bottoms fraction containing a minor quantity of said desired product and an overhead fraction containing a major proportion of said desired product, fractionating said overhead fraction in a second fractionation step to form at least a bottoms fraction containing a minor amount of said desired product and an overhead fraction containing a major proportion of said desired product, maintaining the concentration of said desired product in the last of said overhead fractions substantially constant by regulating the degree of said fractionation, measuring the total quantity of said desired product in said bottoms fractions, periodically adjusting said first fractionation step in response to said measured total quantity of desired product to minimize the amount of said desired product in each of said bottoms fractions, and recovering said overhead fraction from said second fractionation step as product of the process.

4. In the separation of a mixture to recover a desired product in a multi-unit fractionation system having at least two fractionation columns performing similar fractionations, the method of controlling said separation comprising measuring the total loss of said desired product from each of said fractionation columns performing similar fractionations, maintaining the purity of said desired product obtained as a product stream from one of said fractionation columns performing similar fractionations substantially constant by regulating the level of operation of said fractionation column, and periodically adjusting the level of operation of the remainder of said fractionation columns performing similar fractionations until the minimum total loss of said desired product from said fractionation system is obtained.

5. The method of separating a fluid mixture which comprises separating a plurality of feed mixtures into respective first and second product streams in a plurality of respective fractionation zones, passing said fluid mixture to the first of said fractionation zones to form the feed mixture to said first fractionation zone, passing one of the product streams from each of said fractionation zones except the last zone to the next of said fractionation zones in series as the feed mixture to the next fractionation zone, operating at least two of said fractionation zones to remove substantially all of a common constituent of said fluid mixture from the respective first product streams from said two zones, measuring the total amounts of a second constituent of said fluid mixture removed in said respective first product streams from said two zones, and regulating the separation in the first of said two fractionation zones in response to the measured total amounts of said second constituent to minimize the measured amounts of said second constituent.

6. The method of separating a fluid mixture which comprises separating a plurality of feed mixtures into respective first and second product streams in a plurality of respective fractionation zones, passing said fluid mixture to the first of said fractionation zones to form the feed mixture to said first fractionation zone, passing one of the product streams from each of said fractionation zones except the last zone to the next of said fractionation zones in series as the feed mixture to the next fractionation zone, operating at least three of said fractionation zones to remove substantially all of a common constituent of said fluid mixture from the respective first product streams from said three zones, measuring the total amounts of a second constituent of said fluid mixture removed in said respective first product streams from said three zones, and regulating the separation in the first of said three fractionation zones in response to the measured total amounts of said second constituent to minimize the measured amounts of said second constituent.

7. The method of separating an ethylene-ethane mixture containing higher and lower boiling constituents to form an ethylene product stream comprising fractionating said mixture in a first fractionation step to form an overhead fraction of lower boiling constituents containing a minor amount of ethylene and a bottom fraction of ethylene-ethane and higher boiling constituents and a minor amount of lower boiling constituents, fractionating said bottoms fraction in a second fractionation step to form an overhead fraction of ethylene-ethane in a minor amount of lower boiling constituents and a bottoms fraction of higher boiling constituents, fractionating said last obtained overhead fraction in a third fractionation step to form an overhead fraction of ethylene containing a minor amount of lower boiling constituents and a bottoms fraction of ethane, fractionating said last obtained overhead fraction in a fourth fractionation step to form an overhead fraction of lower boiling constituents containing a minor amount of ethylene and a bottoms fraction of ethylene, measuring the concentration of lower boiling constituents in said last obtained bottoms fraction, maintaining the concentration of ethylene in said last obtained bottoms fraction substantially constant by adjusting heat input to said fourth fractionation step in response to said measurement of the concentration of lower boiling constituents in said last obtained bottoms fraction, measuring the temperature in said first fractionation zone, maintaining the separation in said first fractionation step substantially constant by adjusting heat input in said first fractionation step in response to said measuring temperature, measuring the total quantity of ethylene in said overhead fractionations formed in said first and fourth fractionation steps, periodically further adjusting said heat input in said first fractionation step in response to said measurement of ethylene, and recovering said bottoms fraction from said fourth fractionation step as ethylene product.

8. Apparatus for separating a fluid mixture comprising a series of fractionation columns, first conduit means communicating with the first of said columns to introduce a fluid mixture to be separated, second conduit means communicating with upper regions of each of said columns to remove respective first product streams, third conduit means communicating with lower regions of each of said columns to remove respective second product streams, means to direct one of the product streams from each of said columns except the last to the next column in series as the feed thereto, means to measure the total amounts of a constituent of corresponding product streams from at least two of said columns, and means responsive to said means to measure to regulate the separation in said first column.

9. Apparatus for separating a fluid mixture comprising a series of fractionation columns, first conduit means communicating with the first of said columns to introduce a fluid mixture to be separated, second conduit means communicating with upper regions of each of said columns to remove respective first product streams, third conduit means communicating with lower regions of each of said columns to remove respective second product streams, means to direct one of the product streams from each of said columns except the last to the next column in series as the feed thereto, first means to measure the concentration of a constituent of one of the product streams from the last of said columns, means responsive to said first means to measure to regulate the separation in said last column, second means to measure a constituent of corresponding product streams from at least two of said columns, and means responsive to said second means to measure to regulate the separation in said first column.

10. The apparatus of claim 9 wherein said means responsive to said second means to measure includes optimizing means to compare the total measured amounts of said constituent with a previously measured amount of said constituent to maintain the measured concentration of said constituent at a minimum.

11. The apparatus of claim 9 wherein said means responsive to said second means to measure regulates the heat supplied to said first column.

12. Apparatus for separating a fluid mixture comprising a series of fractionation columns, first conduit means communicating with the first of said columns to introduce a fluid mixture to be separated, second conduit means communicating with upper regions of each of said columns to remove respective first product streams, third conduit means communicating with lower regions of each of said columns to remove respective second product streams, means to direct one of the product streams from each of said columns except the last to the next column in series as the feed thereto, means to measure the total amounts of a constituent in at least two of said first product streams, and means responsive to said means to measure to adjust the heat supplied to said first column.

13. Apparatus for separating a fluid mixture comprising a series of fractionation columns, first conduit means communicating with the first of said columns to introduce a fluid mixture to be separated, second conduit means communicating with upper regions of each of said columns to remove respective first product stream, third conduit means communicating with lower regions of each of said columns to remove respective second product streams, means to direct one of the product streams from each of said columns except the last to the next column in series as the feed thereto, means to measure the total amounts of a constituent in at least two of said second product streams, and means responsive to said means to measure to adjust the heat supplied to said first column.

References Cited in the file of this patent

UNITED STATES PATENTS

| | | |
|---|---|---|
| 2,067,349 | Schuftan | Jan. 12, 1937 |
| 2,599,133 | Schilling | June 3, 1952 |
| 2,764,536 | Hutchins | Sept. 25, 1956 |
| 2,771,149 | Miller et al. | Nov. 20, 1956 |
| 2,785,544 | Levin et al. | Mar. 19, 1957 |
| 2,813,920 | Cobbs | Nov. 19, 1957 |
| 2,835,116 | Miller | May 20, 1958 |